(12) United States Patent
Kikuchi

(10) Patent No.: US 12,152,883 B2
(45) Date of Patent: Nov. 26, 2024

(54) THREE-DIMENSIONAL POSITION MEASURING SYSTEM, MEASURING METHOD, AND STORAGE MEDIUM

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 499 days.

(21) Appl. No.: 17/667,152

(22) Filed: Feb. 8, 2022

(65) Prior Publication Data

US 2022/0276049 A1   Sep. 1, 2022

(30) Foreign Application Priority Data

Mar. 1, 2021   (JP) ................. 2021-031371

(51) Int. Cl.
G01C 15/00   (2006.01)
G01C 15/06   (2006.01)
G06F 30/12   (2020.01)
G06F 30/13   (2020.01)
G06F 111/18  (2020.01)

(52) U.S. Cl.
CPC .......... G01C 15/008 (2013.01); G01C 15/06 (2013.01); G06F 30/12 (2020.01); G06F 30/13 (2020.01); *G06F 2111/18* (2020.01)

(58) Field of Classification Search
CPC .... G01C 15/008; G01C 15/06; G01C 15/002; G06F 30/12; G06F 30/13; G06F 2111/18
See application file for complete search history.

(56) References Cited

U.S. PATENT DOCUMENTS

| 7,508,980 B2 * | 3/2009 | Otani | G01C 11/02 382/284 |
| 11,403,826 B2 * | 8/2022 | Kikuchi | G06F 3/011 |
| 11,725,938 B2 * | 8/2023 | Sasaki | G01C 15/06 356/4.01 |

(Continued)

OTHER PUBLICATIONS

U.S. Appl. No. 17/581,308, filed Jan. 21, 2022.
U.S. Appl. No. 17/667,163, filed Feb. 8, 2022.

*Primary Examiner* — Yaritza Guadalupe-McCall
(74) *Attorney, Agent, or Firm* — Studebaker & Brackett PC

(57) ABSTRACT

A measuring system includes a surveying instrument including a distance-measuring section, an angle-measuring section, an imaging section, a drive section, and a communication section, a measuring marker to be carried by a worker, including a position sensor, a posture sensor, a laser emitting section, a laser light emission port, a distance meter, and a communication section, an eyewear device to be worn on the head of the worker, including a display, an imaging section, a position sensor, a posture sensor, and a communication section, and an arithmetic device configured to synchronize coordinate of the above devices, and calculate an identified three-dimensional position of the measurement point by image analysis from images imaged by the imaging sections of the surveying instrument and the eyewear device, and measures the identified three-dimensional positions of a plurality of the measurement points in the order in which measurement instructions were issued by the worker.

8 Claims, 14 Drawing Sheets

(56) References Cited

U.S. PATENT DOCUMENTS

| | | | |
|---|---|---|---|
| 11,966,508 B2* | 4/2024 | Kikuchi | G06F 3/013 |
| 2009/0235541 A1 | 9/2009 | Kumagai et al. | |
| 2009/0244277 A1* | 10/2009 | Nagashima | G01C 15/002 |
| | | | 345/173 |
| 2014/0049452 A1* | 2/2014 | Maltz | G02B 27/017 |
| | | | 345/8 |
| 2019/0094021 A1* | 3/2019 | Singer | G01C 15/008 |
| 2021/0080255 A1* | 3/2021 | Kikuchi | G01C 15/002 |
| 2022/0252396 A1* | 8/2022 | Kikuchi | G01S 17/86 |
| 2022/0276049 A1* | 9/2022 | Kikuchi | G01C 15/06 |
| 2022/0276050 A1* | 9/2022 | Kikuchi | G06V 30/228 |
| 2023/0096054 A1* | 3/2023 | Kikuchi | G01C 15/002 |
| | | | 356/3 |
| 2023/0114255 A1* | 4/2023 | Kikuchi | G06F 3/011 |
| | | | 356/4.01 |
| 2023/0160694 A1* | 5/2023 | Kikuchi | G01S 17/89 |
| | | | 348/47 |
| 2023/0168377 A1* | 6/2023 | Kikuchi | G01S 17/42 |
| | | | 356/4.01 |
| 2024/0112327 A1* | 4/2024 | Kikuchi | G06T 7/0006 |
| 2024/0112406 A1* | 4/2024 | Kikuchi | E04C 5/01 |

* cited by examiner

Flow to be performed by worker

Flow to be performed by measuring system

| Measurement point ID | Latitude | Longitude | Elevation | Time |
|---|---|---|---|---|
| x1 | 139.7434 | 35.6612 | 3.00 | 12:00 |
| x2 | ....... | ...... | .... | ..... |
| x3 | ....... | ...... | .... | ..... |
| ⋮ | | | | |
| xn | ....... | ...... | .... | ..... |
| ⋮ | | | | |

| Measurement point ID | Latitude | Longitude | Elevation | Time | Measurement accuracy |
|---|---|---|---|---|---|
| x1 | 139.7434 | 35.6612 | 3.00 | 12:00 | Excellent |
| x2 | ....... | ....... | .... | ..... | Good |
| x3 | ....... | ....... | .... | ..... | Acceptable |
| ⋮ | | | | | |
| xk | ....... | ....... | .... | ..... | Unacceptable |
| ⋮ | | | | | |

When surveying instrument includes arithmetic device and storage device

When eyewear device includes arithmetic device and storage device

When measuring marker includes arithmetic device and storage device

THREE-DIMENSIONAL POSITION MEASURING SYSTEM, MEASURING METHOD, AND STORAGE MEDIUM

TECHNICAL FIELD

The present invention relates to a system, method, and program for accurately and quickly measuring three-dimensional positions of a plurality of measurement points.

BACKGROUND ART

In a survey, a measurement point is designated by a certain method, a surveying instrument (total station) is used to collimate the measurement point, and a measurement (distance measuring/angle measuring) is performed. As for recent surveying instruments, when the surveying instrument points toward the approximate measurement point, it automatically collimates the measurement point, so that a worker can perform a survey individually.

Here, when measuring a plurality of measurement points, the measurement is performed through the steps illustrated in FIG. 13. In FIG. 13, a work to be performed by a worker is represented by a thin frame, and a work to be performed by the instrument is represented by a thick frame. First, in Step S1001, a worker moves to a first measurement point. Next, in Step S1002, the worker who has designated the measurement point issues a measurement instruction to the surveying instrument. Next, in Step S1003, the surveying instrument receives the measurement instruction. Next, in Step S1004, the surveying instrument searches for the measurement point. Next, in Step S1005, the surveying instrument captures the measurement point in its visual field, and automatically measures the measurement point. The work of these Steps S1001 to S1005 is repeated for the plurality of measurement points.

In these steps, various techniques for shortening the search time for the measurement point in Step S1004 are available, and for example, Patent Literature 1 discloses a technology in which, since searching for the measurement point in the visual field of the surveying instrument takes time, the surveying instrument includes a fan-shaped laser, and searches for an approximate position of the measurement point by the fan-shaped laser to shorten the search time for the measurement point.

CITATION LIST

Patent Literature

Patent Literature 1: Japanese Published Unexamined Patent Application No. 2009-229192

SUMMARY OF INVENTION

Technical Problem

The search time for the measurement point (Step S1004) can be shortened by the technology described in Patent Literature 1. However, when there are a plurality of measurement points x1, x2, x3, ... xn, ..., the worker performs the work in such a way that the worker designates a measurement point xn and waits for the measurement point xn to be measured by the surveying instrument (Steps S1003 to S1005), and then, moves to the next measurement point xn+1 and waits for the measurement point xn+1 to be measured by the surveying instrument (Step S1003 to S1005), and then, moves to the next measurement point xn+2 and waits for the measurement point xn+2 to be measured by the surveying instrument (Steps S1003 to S1005). That is, as long as the measurement by the surveying instrument is in progress, the worker has to wait to move to the next measurement point. Therefore, there is a request from workers to designate the measurement points one after another without waiting for the measurement to be performed by the surveying instrument.

The present invention was made to solve the problem described above, and an object thereof is to provide a system, method, and program for accurately and quickly measuring three-dimensional positions of a plurality of measurement points.

Solution to Problem

A three-dimensional position measuring system according to an aspect of the present invention includes a surveying instrument including a distance-measuring section capable of performing a non-prism distance measuring of a measurement point by distance-measuring light, an imaging section configured to perform imaging in an optical axis direction of the distance-measuring light, an angle-measuring section configured to measure a vertical angle and a horizontal angle at which the distance-measuring section is oriented, a drive section configured to drive the vertical angle and the horizontal angle of the distance-measuring section to set angles, and a communication section, a measuring marker to be carried by a worker, including a position sensor, a posture sensor, a laser emitting section configured to emit laser light of visible light in an axial direction, an emission port for the laser light, a distance meter configured to measure a laser distance from the emission port to the measurement point, and a communication section, an eyewear device to be worn on the head of the worker, including a display configured to cover the eyes of the worker, an imaging section configured to perform imaging in a line-of-sight direction of the worker, a position sensor, a posture sensor, and a communication section, and an arithmetic device configured to communicate with the surveying instrument, the measuring marker, and the eyewear device, synchronize coordinate spaces of the surveying instrument, the measuring marker, and the eyewear device, and calculate an identified three-dimensional position of the measurement point by image analysis from images including the measurement point imaged by the imaging section of the surveying instrument and the imaging section of the eyewear device, wherein the identified three-dimensional positions of a plurality of the measurement points are measured by the surveying instrument in the order in which measurement instructions were issued by the worker.

In the aspect described above, it is also preferable that when the worker irradiates a certain measurement point among the plurality of measurement points with the laser light of the measuring marker while visually recognizing the measurement point with the eyewear device, and issues the measurement instruction, the measuring marker calculates a position and a posture of the emission port from the position sensor and the posture sensor of the measuring marker, and measures the laser distance by the distance meter, the eyewear device images an image including an image of the laser light by the imaging section of the eyewear device, the surveying instrument images an image including an image of the laser light by the imaging section of the surveying instrument based on an approximate three-dimensional position of the measurement point calculated by offset observation from the position and the posture of the emission port of the measuring marker and the laser distance, and the arithmetic device performs, as the image analysis, image matching between images including the image of the laser light imaged by the imaging section of the surveying instrument and the imaging section of the eyewear device, specifies an end point position of the image of the laser light as a position of the measurement point and calculates the identified three-dimensional position.

In the aspect described above, it is also preferable that the three-dimensional position measuring system further includes a storage device configured to store CAD design data of a survey site of the worker, and the arithmetic device synchronizes coordinate spaces of the surveying instrument, the measuring marker, the eyewear device, and the CAD design data, and displays a wire frame of the CAD design data viewed from the position and the posture of the eyewear device on the display of the eyewear device so that the wire frame is superimposed on an actual landscape of the survey site.

In the aspect described above, it is also preferable that the three-dimensional position measuring system further includes a display section capable of being checked at the survey site by the worker, and on the display section, three-dimensional position data of the plurality of measurement points measured by the surveying instrument are displayed in list form together with identification IDs in order of measurement.

In the aspect described above, it is also preferable that when a measurement point where the surveying instrument has failed to measure occurs, the three-dimensional position measuring system notifies the worker of the failure through the eyewear device, and prompts the worker on how to process the measurement point and causes the worker to make a choice through the eyewear device.

In the aspect described above, it is also preferable that the three-dimensional position measuring system lowers a measurement accuracy index of the measurement as a time to be taken for the image analysis becomes longer, and also displays the measurement accuracy index in the list form.

In order to solve the problem described above, a three-dimensional position measuring method according to an aspect of the present invention includes a surveying instrument, a measuring marker, an eyewear device, and an arithmetic device, and for a plurality of measurement points, in the order in which measurement instructions were issued by a worker, repeats the following (a) to (e): (a) a step of transmitting position information and posture information of an emission port for laser light of the measuring marker with which the measurement point has been irradiated, and a laser distance from the emission port to the measurement point, to the arithmetic device, (b) a step of acquiring an image including an image of the laser light at the time of the step (a) by an imaging section of the eyewear device, (c) a step of calculating an approximate three-dimensional position of the measurement point by offset observation from the position and the posture of the emission port of the measuring marker and the laser distance, and imaging the approximate three-dimensional position by an imaging section of the surveying instrument to acquire an image including an image of the laser light, (d) a step of performing image matching between the image acquired by the eyewear device in the step (b) and the image acquired by the surveying instrument in the step (c), and specifying an end point position of the image of the laser light as an identified three-dimensional position of the measurement point of the step (a), and (e) a step of measuring the identified three-dimensional position by the surveying instrument.

A storage medium storing a computer program of the three-dimensional position measuring method of the aspect described above is also preferable.

Advantageous Effects of Invention

According to the present invention, a technology for accurately and quickly measuring three-dimensional positions of a plurality of measurement points can be provided.

BRIEF DESCRIPTION OF DRAWINGS

FIG. 9 is a display example of measurement results obtained by the same measuring method.

FIG. 11 is a display example of measurement results according to Modification 2.

DESCRIPTION OF EMBODIMENTS

Next, preferred embodiments of the present invention will be described with reference to the drawings.

1. First Embodiment

1-1. Configuration of Measuring System

Figure 1:
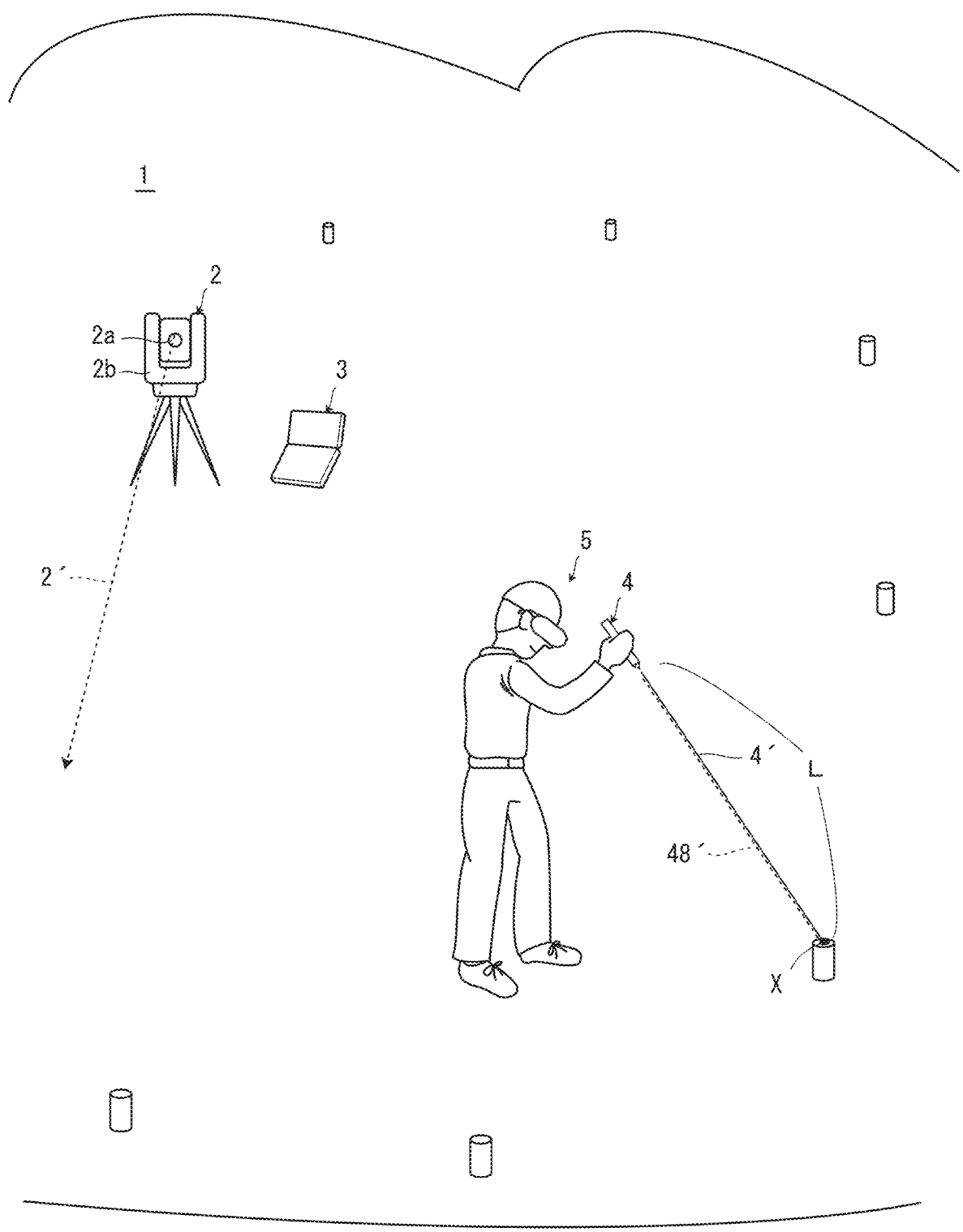
FIG. 1 is an external perspective view of a three-dimensional position measuring system according to an embodiment of the present invention.
Figure 2:
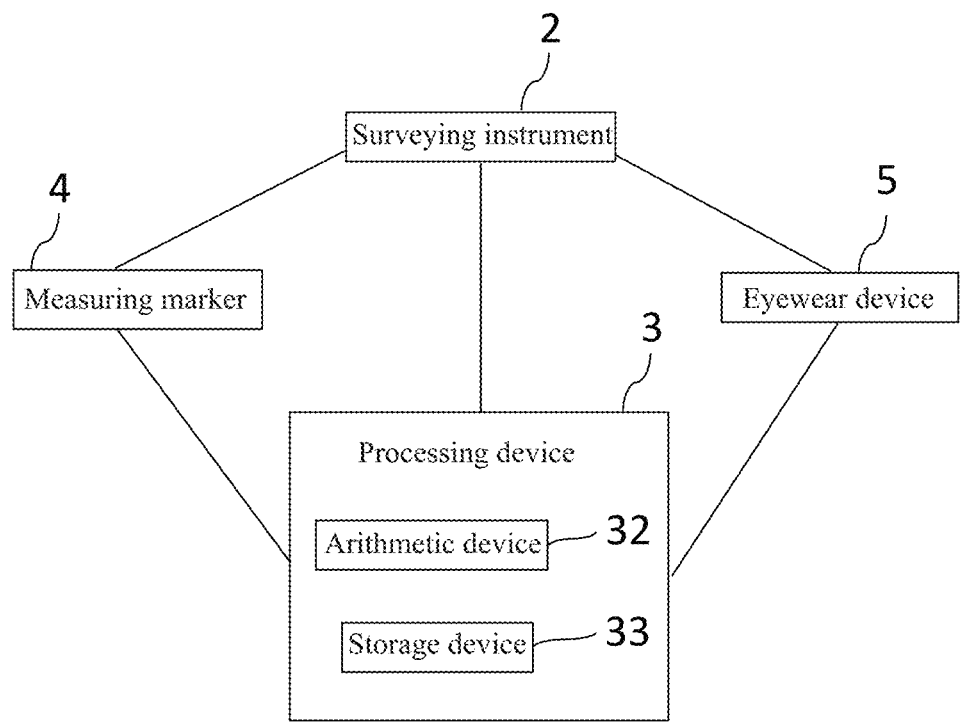
FIG. 2 is a configuration block diagram of the same measuring system.

FIG. 1 is an external perspective view of a three-dimensional position measuring system according to an embodiment of the present invention, and illustrates a work image at a survey site. FIG. 2 is a configuration block diagram of the same measuring system. As illustrated in FIG. 1, a three-dimensional position measuring system 1 (hereinafter, simply referred to as measuring system 1) includes a surveying instrument 2, a processing device 3, a measuring marker 4, and an eyewear device 5.

In the measuring system 1, the surveying instrument 2, the processing device 3, the measuring marker 4, and the eyewear device 5 can wirelessly communicate with each other. As illustrated in FIG. 2, the processing device 3 includes an arithmetic device 32 (described later) that synchronizes the surveying instrument 2, the measuring marker 4, and the eyewear device 5, and performs various processes, and a storage device 33 (described later) that stores design data of the survey site.

Configurations of the surveying instrument 2, the processing device 3, the measuring marker 4, and the eyewear device 5 will be described in detail.

1-2. Configuration of Surveying Instrument

Figure 3:
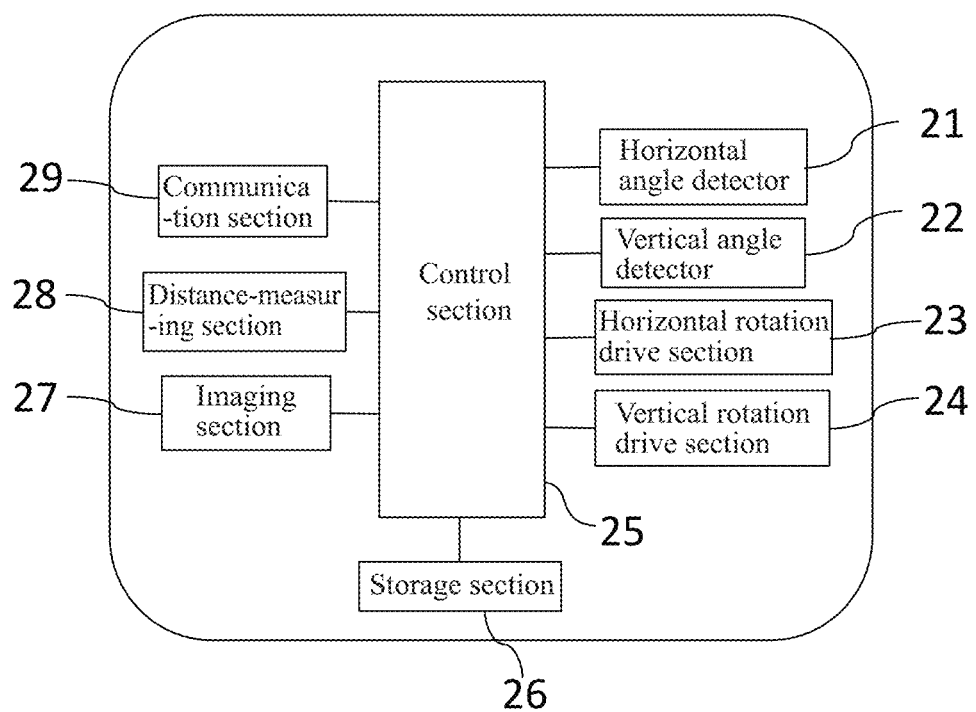
FIG. 3 is a configuration block diagram of a surveying instrument related to the same measuring system.

The surveying instrument 2 is installed at the survey site by using a tripod. The surveying instrument 2 includes, in order from the lower side, a leveling section, a base portion provided on the leveling section, a bracket portion 2b that rotates horizontally on the base portion, and a telescope 2a that rotates vertically at a center of the bracket portion 2b. FIG. 3 is a configuration block diagram of the surveying instrument 2 related to the measuring system 1. The surveying instrument 2 is a motor-driven total station, and includes a horizontal angle detector 21, a vertical angle detector 22, a horizontal rotation drive section 23, a vertical rotation drive section 24, a control section 25, a storage section 26, an imaging section 27, a distance-measuring section 28, and a communication section 29. The elements 21, 22, 23, 24, 25, 26, and 29 are housed in the bracket portion 2b, and the distance-measuring section 28 and the imaging section 27 are housed in the telescope 2a. Further, the surveying instrument 2 includes a display section and an operation section (not illustrated) as interfaces for performing a conventional measurement.

The horizontal angle detector 21 and the vertical angle detector 22 are encoders. The horizontal angle detector 21 is provided on a rotary shaft of the bracket portion 2b, and detects a horizontal angle of the bracket portion 2b. The vertical angle detector 22 is provided on a rotary shaft of the telescope 2a, and detects a vertical angle of the telescope 2a (the detectors 21 and 22 are the "angle-measuring sections" in the claims). The horizontal rotation drive section 23 and the vertical rotation drive section 24 are motors. The horizontal rotation drive section 23 drives the rotary shaft of the bracket portion 2b, and the vertical rotation drive section 24 drives the rotary shaft of the telescope 2a (the drive sections 23 and 24 are the "drive sections" in the claims). By cooperative operation of the drive sections 23 and 24, the orientation of the telescope 2a is changed.

The distance-measuring section 28 includes a light transmitting section and a light receiving section, and emits distance-measuring light 2' (FIG. 1), for example, infrared pulsed laser, etc., from the light transmitting section, receives reflected light of the distance-measuring light 2' by the light receiving section, and measures a distance from a phase difference between the distance-measuring light 2' and internal reference light. The distance-measuring section 28 can perform both of a reflection prism distance measuring in which a distance to a prism is measured by causing the distance-measuring light 2' to be reflected by the prism, and a non-prism distance measuring in which a distance to an object other than a prism is measured by irradiating the object with the distance-measuring light 2'. The imaging section 27 is an image sensor (for example, a CCD sensor or CMOS sensor). The imaging section 27 is configured integrally with the distance-measuring section 28 inside the telescope 2a, and images an image in an optical axis direction of the distance-measuring light 2'. The imaging section 27 can perform imaging at a wide angle in up-down and left-right directions with respect to an origin set at an optical axis of the distance-measuring light 2' of the distance-measuring section 28. The communication section 29 has communication standards equivalent to those of, for example, a communication section 31 (described later) of the processing device 3.

The control section 25 includes a CPU (Central Processing Unit), and performs, as controls, information transmission and reception through the communication section 29, driving of the respective rotary shafts by the drive sections 23 and 24, distance measuring by the distance-measuring section 28, angle measuring by the detectors 21 and 22, and imaging by the imaging section 27. The storage section 26 includes a ROM (Read Only Memory) and a RAM (Random Access Memory). In the ROM, programs for the control section 25 are stored, and are read by the RAM to execute the respective controls. Three-dimensional position data measured (distance measuring/angle measuring) by the surveying instrument 2 are recorded in a recording area described later.

1-3. Configuration of Measuring Marker

Figure 4A:
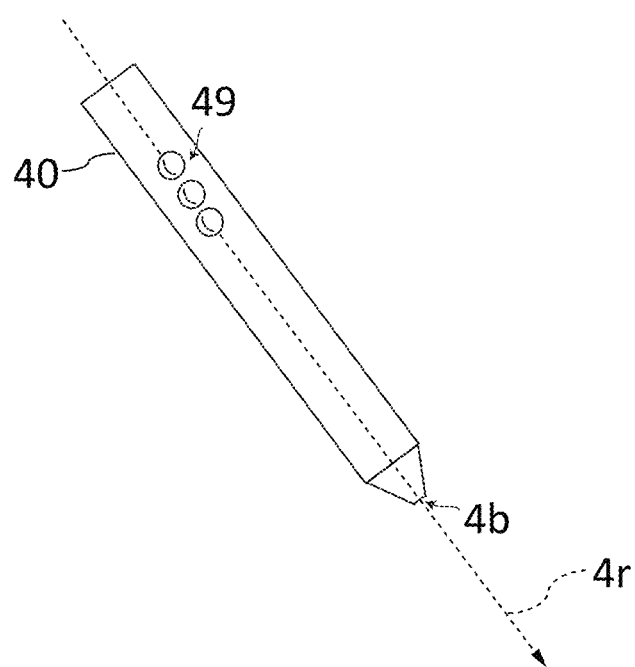
FIG. 4A illustrate a measuring marker related to the same measuring system and is a perspective view of the measuring marker.
Figure 4B:
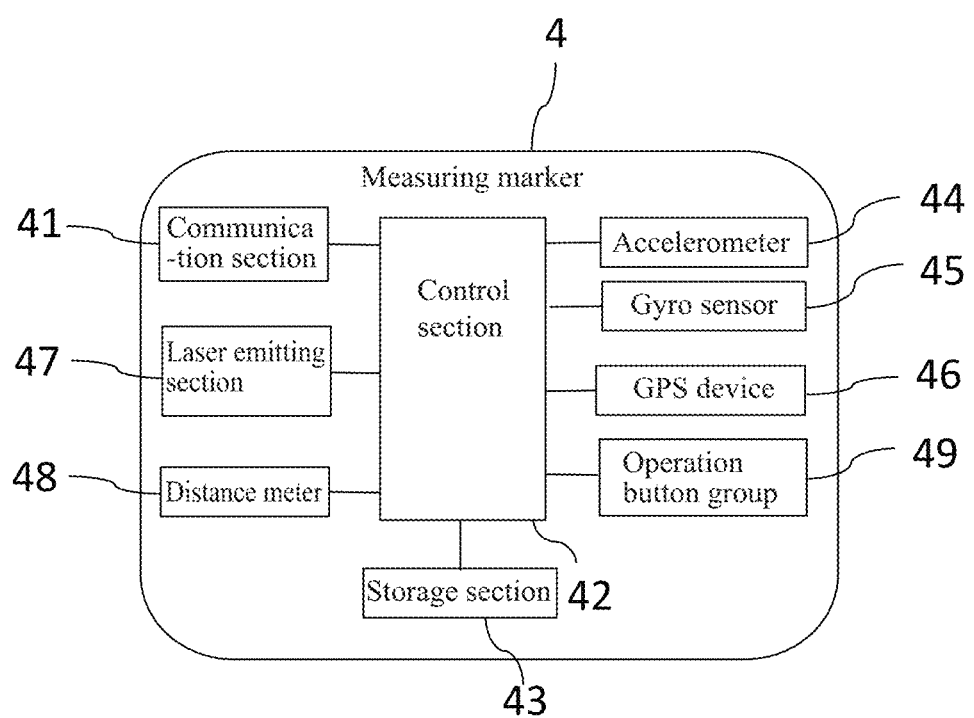
FIG. 4B is a configuration block diagram of the measuring marker.

The measuring marker 4 is carried by a worker and used near a measurement point X (FIG. 1). FIG. 4A is a perspective view of the measuring marker 4 related to the measuring system 1, and FIG. 4B is a configuration block diagram of the same measuring marker 4. As illustrated in FIG. 4A, the measuring marker 4 includes a stick body 40 having a length that a worker can hold by hand and handle, and an emission port 4b for laser light 4' (FIG. 1) on its tip end. As illustrated in FIG. 4B, the measuring marker 4 includes a communication section 41, a control section 42, a storage section 43, an accelerometer 44, a gyro sensor 45, a GPS device 46, a laser emitting section 47, a distance meter 48, and an operation button group 49.

The communication section 41 has communication standards equivalent to those of, for example, the communication section 31 (described later) of the processing device 3. The accelerometer 44 detects accelerations in three-axis directions of the measuring marker 4. The gyro sensor 45 detects rotations around three axes of the measuring marker 4. The accelerometer 44 and the gyro sensor 45 are the "posture sensors" of the measuring marker 4 in the claims. The GPS device 46 detects a position of the measuring marker 4 based on a signal from a GPS (Global Positioning System). The GPS device 46 is the "position sensor" of the measuring marker 4 in the claims. The GPS device 46 may use positioning information obtained by a GNSS, a quasi-zenith satellite system, GALILEO, or GLONAS.

The laser emitting section 47 includes a light source and a light emission control IC for the light source, and linearly emits laser light 4' in visible color in an axial direction of the stick body 40 of the measuring marker 4 (hereinafter, the direction is identified as a direction toward the emission port 4b and referred to as a marker axial direction 4r. The marker axial direction 4r is the "axial direction" in the claims). The distance meter 48 includes a light transmitting section and a light receiving section, emits distance-measuring light, for example, infrared pulsed laser, etc., (hereinafter, referred to as a marker distance-measuring light 48' to distinguish it from the distance-measuring light 2' of the surveying instrument 2. FIG. 1) from the light transmitting section, and measures a distance based on a time to light reception and light speed. The distance meter 48 is housed so that an optical axis of the marker distance-measuring light 48' matches the optical axis of the laser light 4'.

The control section 42 includes a CPU, and performs, as controls, emission of laser light 4', information detection from the posture sensor 44, 45 and the position sensor 46, information transmission through the communication section 41, and calculation of posture information and position information of the emission port 4b (described later). The storage section 43 includes a ROM and a RAM, and enables the respective controls of the control section 42.

Here, the elements 41, 42, 43, 44, 45, 46, 47, and 48 are configured by using a dedicated module and IC configured by using integrated-circuit technology. Inside the stick body 40 of the measuring marker 4, the elements 44, 45, 46, and 48 are disposed on the marker axial direction 4r, and positional relationships of these with the emission port 4b (separating distances from the emission port 4b) are measured and stored in advance in the storage section 43.

1-4. Configuration of Eyewear Device

Figure 5A:
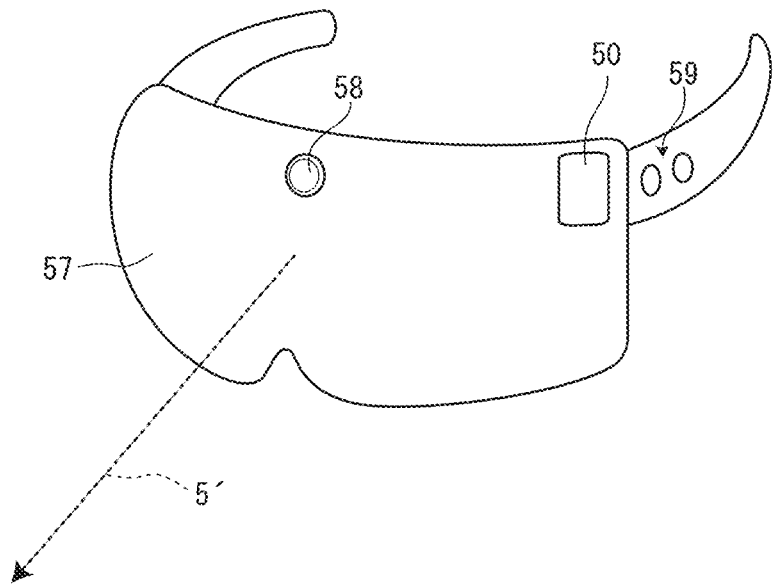
FIG. 5A illustrate an eyewear device related to the same measuring system and is a perspective view of the eyewear device.
Figure 5B:
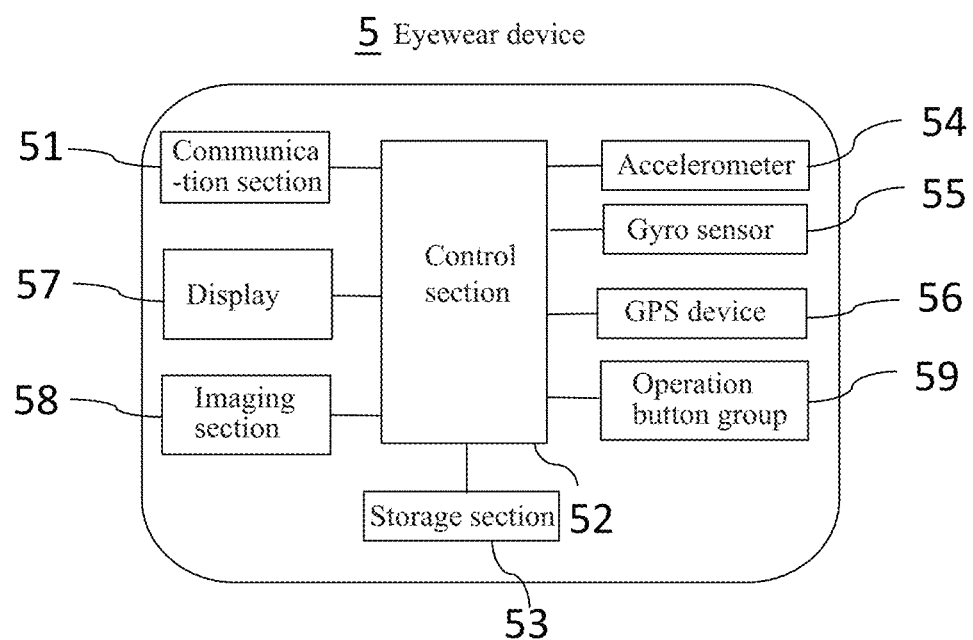
FIG. 5B is a configuration block diagram of the eyewear device.

The eyewear device 5 is an eyeglasses-type image display device to be worn on the head of a worker. FIG. 5A is an external perspective view of the eyewear device 5 related to the measuring system 1, and FIG. 5B is a configuration block diagram of the same eyewear device 5. As illustrated in FIG. 5B, the eyewear device 5 includes a communication section 51, a control section 52, a storage section 53, an accelerometer 54, a gyro sensor 55, a GPS device 56, a display 57, an imaging section 58, and an operation button group 59. Here, the elements 51, 52, 53, 54, 55, and 56 are configured by using a dedicated module and IC configured by using integrated-circuit technology, and are housed in a processing BOX 50 (FIG. 5A) at an arbitrary position.

The communication section 51 has communication standards equivalent to those of, for example, the communication section 31 (described later) of the processing device 3. The display 57 is a liquid crystal or an organic EL screen, and is disposed to cover the eyes of the worker (FIG. 5A). The accelerometer 54, the gyro sensor 55, and the GPS device 56 are equivalent to those of the measuring marker 4. The imaging section 58 is an image sensor (for example, a CCD sensor or CMOS sensor), and is disposed at an upper portion central position of the display 57, and by setting this central position as an origin, the imaging section 58 can perform imaging in a worker's line-of-sight direction (reference sign 5' in FIG. 5A) at a wide angle in up-down and left-right directions of the origin.

The control section 52 includes a CPU, and performs, as controls, information detection from the posture sensor 54, 55 and the position sensor 56, information transmission and reception through the communication section 51, imaging by the imaging section 58, and display of a wire frame (described later) on the display 57. The storage section 53 includes a ROM and a RAM, and enables the respective controls of the control section 52.

1-5. Configuration of Processing Device

Figure 6:
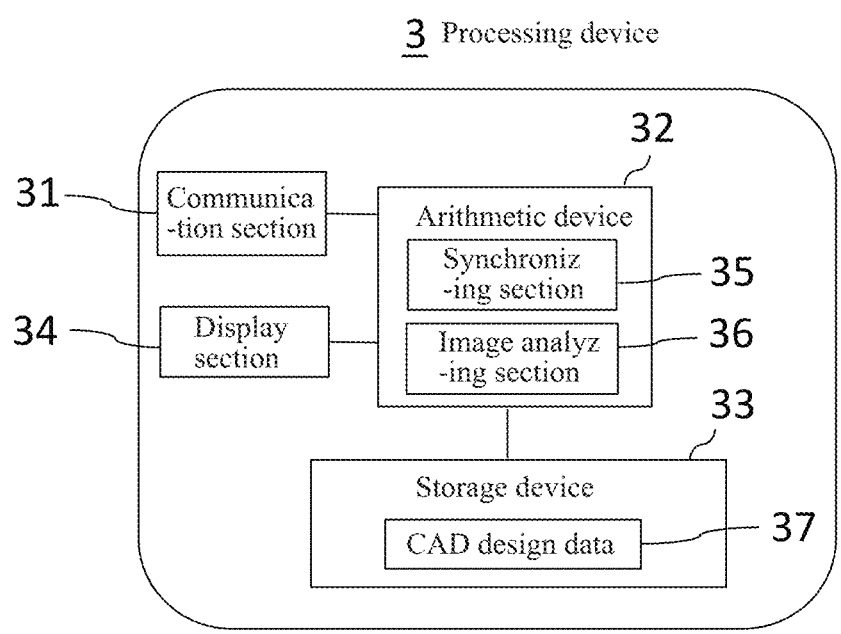
FIG. 6 is a configuration block diagram of a processing device related to the same measuring system.

The processing device 3 may be at an arbitrary location in the survey site. The processing device 3 is a general-purpose personal computer, dedicated hardware configured by PLD (Programmable Logic Device), etc., or a high-performance tablet terminal, etc. FIG. 6 is a configuration block diagram of the processing device 3 related to the measuring system 1. As illustrated in FIG. 6, the processing device 3 includes at least the communication section 31, the arithmetic device 32, the storage device 33, and a display section 34.

The communication section 31 can wirelessly communicate with the communication section 29 of the surveying instrument 2, the communication section 41 of the measuring marker 4, and the communication section 51 of the eyewear device 5. For communication, any one of or a combination of Bluetooth (registered trademark), various wireless LAN standards, infrared communication, mobile phone lines, and other wireless lines, etc., can be used.

The storage device 33 includes a high-capacity storage medium such as an HDD, and stores a 3D wire frame of CAD design data 37 of a structure, etc., to be constructed at the survey site.

The arithmetic device 32 includes a high-performance CPU, and a synchronizing section 35 and an image analyzing section 36 are configured by software. The synchronizing section 35 receives position and posture information of the surveying instrument 2, position and posture information of (emission port 4b of) the measuring marker 4, and position and posture information of the eyewear device 5, and synchronizes a coordinate space of the surveying instrument 2, a coordinate space of the measuring marker 4, a coordinate space of the eyewear device 5, and a coordinate space of the CAD design data 37 (described later). In addition, the synchronizing section 35 transmits information of the synchronized CAD design data 37 to the eyewear device 5. The image analyzing section 36 performs image analysis for an image received from the eyewear device 5 and an image received from the surveying instrument 2, and identifies a three-dimensional position of a measurement point X (described later).

The display section 34 is a liquid crystal or an organic EL display, and displays measurement results (three-dimensional position data) of a plurality of measurement points X in list form (described later).

1-6. Synchronization of Measuring System

Before starting a measurement, synchronization of the measuring system 1 (the surveying instrument 2, the processing device 3, the measuring marker 4, and the eyewear device 5) is performed. The synchronization is a work to enable grasping of respective positions and postures of these four instruments in the same coordinate space. Hereinafter, an example considered to be preferred will be described, however, the synchronization may be performed by a method based on the knowledge of a person skilled in the art.

First, for the measuring system 1, a reference point and a reference direction are set in the survey site, and the surveying instrument 2 and the processing device 3 are synchronized. As for the reference point, a known coordinate point (point at known coordinates) or an arbitrary point at the site is selected. As for the reference direction, a characteristic point different from the reference point is arbitrarily selected, and a direction from the reference point to the characteristic point is selected. Then, by observation such as backward intersection using points including the reference point and the characteristic point, a three-dimensional position of the surveying instrument 2 is grasped, and information on the three-dimensional position is transmitted to the processing device 3. The synchronizing section 35 of the processing device 3 recognizes $(x, y, z)=(0, 0, 0)$ as absolute coordinates of the reference point, and recognizes a horizontal angle of 0 degrees as the reference direction. Thereafter, related to information from the surveying instrument 2, the arithmetic device 32 (synchronizing section 35) grasps a position and a posture of the surveying instrument 2 in a coordinate system with an origin set at the reference point.

Next, the measuring marker 4 is synchronized with the processing device 3, and the eyewear device 5 is synchronized with the processing device 3. With respect to the measuring marker 4, in a state where the measuring marker 4 is installed at the reference point, zero coordinates of the GPS device 46 are set to the reference point, and the measuring marker 4 is leveled, the direction of emission of the laser light 4' of the measuring marker 4 is set in the reference direction, and the reference posture of the measuring marker 4 is aligned with the reference direction. Similarly, with respect to the eyewear device 5, in a state where the eyewear device 5 is installed at the reference point, zero coordinates of the GPS device 56 are set to the reference point, and the eyewear device 5 is leveled, the line-of-sight direction 5' is set in the reference direction, and a reference posture of the eyewear device 5 is aligned with the reference direction. Thereafter, related to information from the measuring marker 4 and the eyewear device 5, the arithmetic device 32 (synchronizing section 35) grasps positions and postures of these instruments in a space with an origin set at the reference point.

Alternatively, for synchronization between the measuring marker 4 and the eyewear device 5, the surveying instrument 2 may be used. For example, it is also possible that the measuring marker 4 and the eyewear device 5 are brought closer to the surveying instrument 2, zero coordinates of the GPS devices 46 and 56 are set to coordinates of the surveying instrument 2, and in a horizontal state, a direction of emission of laser light 4' of the measuring marker 4 and the line-of-sight direction 5' of the eyewear device 5 are aligned with distance-measuring light 2' of the surveying instrument 2.

1-7. Measuring Method

Figure 7A:
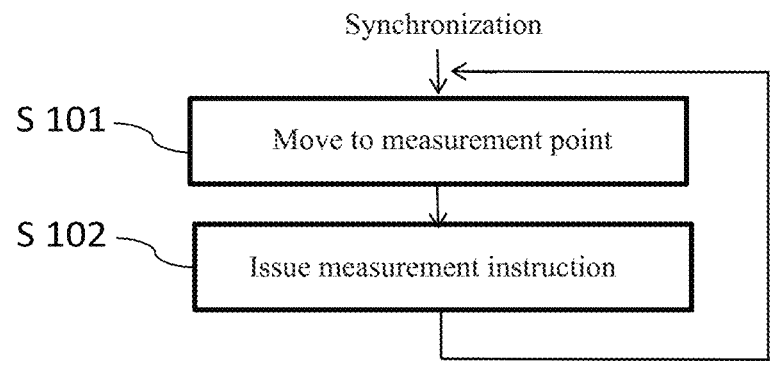
FIG. 7A is a flow of a three-dimensional position measuring method according to an embodiment of the present invention and is a workflow to be performed by a worker.
Figure 7B:
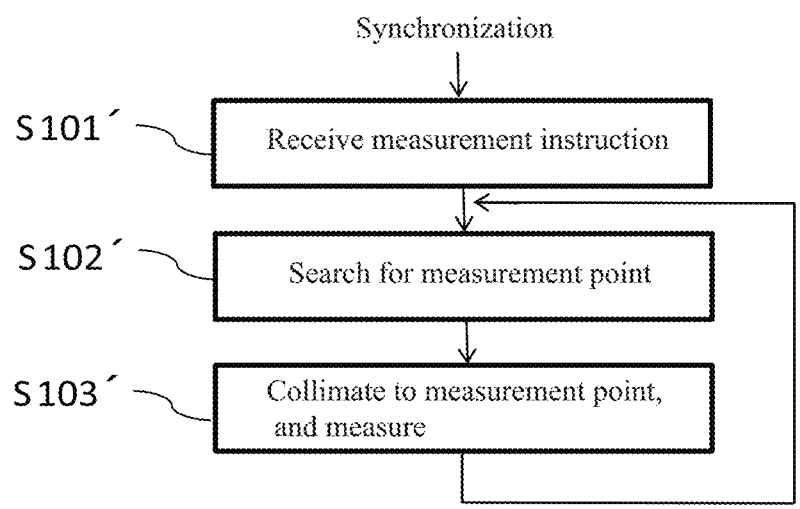
FIG. 7B is a flow of the three-dimensional position measuring method according to the embodiment of the present invention and is a workflow to be performed by a measuring system.
Figure 8A:
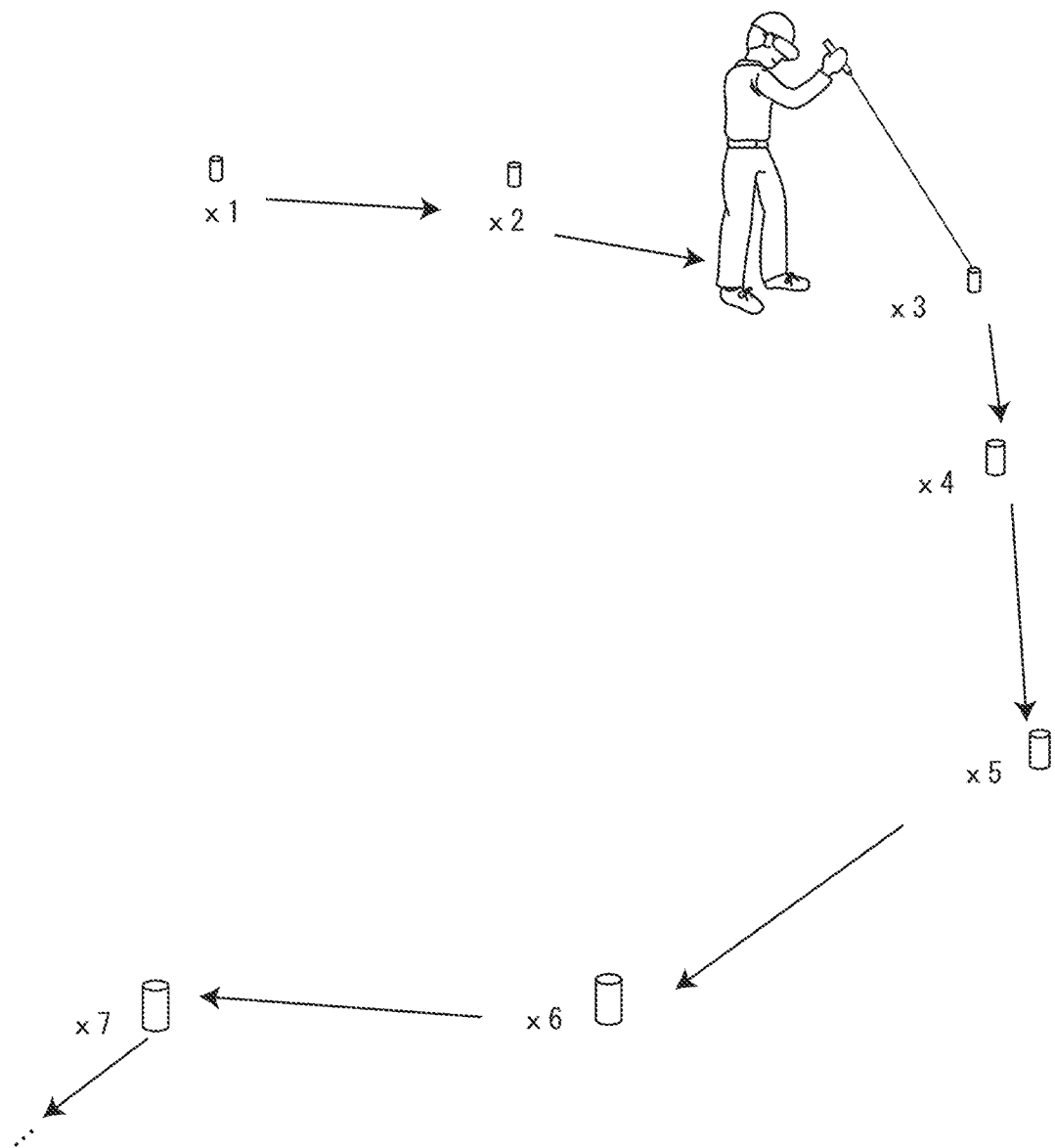
FIG. 8A is a work image view of the same measuring method, illustrating a work image to be performed by a worker.
Figure 8B:
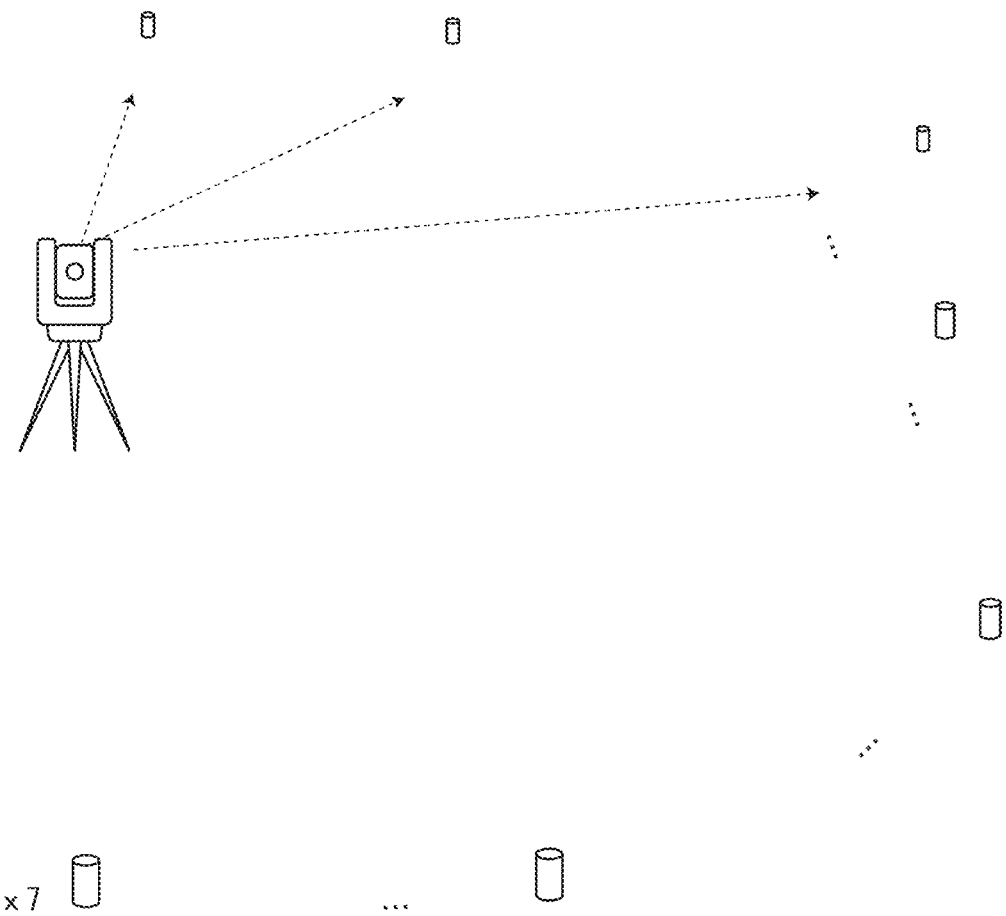
FIG. 8B is a work image view of the same measuring method, illustrating a work image to be performed by a measuring system.

Next, a method for measuring three-dimensional positions of a plurality of measurement points by using the measuring system 1 will be described. FIGS. 7A and 7B are flowcharts of a measuring method according to an embodiment of the present invention, and FIG. 7A illustrates a workflow to be performed by a worker, and FIG. 7B illustrates a workflow to be performed by the measuring system 1. FIG. 8A illustrates a work image to be performed by the worker, and FIG. 8B illustrates a work image to be performed by the measuring system 1. In this description, as for reference letters of measurement points, specified measurement points are denoted by using a lowercase letter "x," such as x1, x2, x3, . . . , and an uppercase letter "X" is attached for a measurement point to be used as an unspecified measurement point or as a general term for the specified measurement points x1, x2, x3.

1-7-1. Workflow to be Performed by Worker

As illustrated in FIG. 7A, when a measurement is started, first, in Step S101, a worker wears the eyewear device 5 on his/her head, carries the measuring marker 4, and moves to the first measurement point x1. Next, in Step S102, the worker irradiates the measurement point x1 with laser light 4' of the measuring marker 4 while visually recognizing the measurement point x1 through the eyewear device 5, and presses a measurement button (the measurement button may be provided on the measuring marker 4 or the eyewear device 5) to issue a measurement instruction. Next, the worker moves to the measurement point x2, and issues a measurement instruction in the same manner. Next, the worker moves to the measurement point x3 and issues a measurement instruction in the same manner. In this way, the worker designates the plurality of measurement points x1, x2, x3, xn, . . . one after another (refer to FIG. 8A as well). After finishing measurement point designation, the worker presses an end button to finish the designation work.

Here, on the display 57 on the worker's head, the wire frame of the CAD design data 37 is displayed to be superimposed on an actual landscape of the survey site. The eyewear device 5 always transmits a position and a posture of the eyewear device 5 to the processing device 3. The processing device 3 that has received the position and posture of the eyewear device 5 transmits the wire frame of the CAD design data 37 to be viewed from the position and the posture of the eyewear device 5 to the eyewear device 5. The eyewear device 5 that has received this wire frame generates an image in which the wire frame is superimposed on an actual landscape acquired with the imaging section 58, and displays the image on the display 57. With the help of the wire frame, the worker determines an irradiation position of the laser light 4' of the measuring marker 4 and designates a measurement point X.

1-7-2. Workflow to be Performed by Measuring System

As illustrated in FIG. 7B, when a measurement is started, the measuring system 1 waits for a measurement instruction from the worker. Then, in S101', when the measuring system 1 receives a measurement instruction to measure the measurement point x1, the processing shifts to S102', and the measuring system 1 searches for the measurement point x1. When the measuring system 1 identifies the measurement point x1, the processing shifts to Step S103', and the surveying instrument 2 collimates the measurement point x1 and measures the measurement point x1. Even during this time, the measuring system 1 accepts measurement instructions for the measurement point x2, x3 . . . . After finishing the measurement of the measurement point x1, the measuring system 1 moves on to search for the next measurement point x2 (S102'), and measures the measurement point x2 (S103'). After finishing the measurement of the measurement point x2, the measuring system 1 moves on to search for the next measurement point x3 (S102'), and measures the measurement point x3 (S103'). In this way, the measuring system 1 searches for and measures the plurality of measurement points x1, x2, x3 . . . , xn, . . . in the order in which the measuring system 1 received the measurement instructions (refer to FIG. 8B as well).

Here, search (S102') and measurement (S103') of measurement points X by the measuring system 1 are performed as follows.

(1) When the worker presses the measurement button while visually recognizing the measurement point X, the measuring marker 4 calculates a posture (marker axial direction 4r) of the emission port 4b from the accelerometer 44 and the gyro sensor 45, and calculates position information of the emission port 4b by offsetting position information of the GPS device 46 by a known separating distance in the marker axial direction 4r. At the same time, the measuring marker 4 measures a distance to the measurement point X by the distance meter 48, measures a distance L from the emission port 4b to the measurement point X (hereinafter, referred to as a laser distance L. FIG. 1), and transmits the position and the posture of the emission port 4b and the laser distance L to the processing device 3.

(2) At the same time, the measuring marker 4 issues a measurement instruction to the eyewear device 5. The eyewear device 5 images an image at the time of reception of the measurement instruction by the imaging section 58, and transmits the image to the processing device 3. This image imaged by the imaging section 58 includes the measurement point X (that is, an end point of an image of the laser light 4' with which the measurement point X is irradiated).

(3) The processing device 3 (arithmetic device 32) calculates an approximate three-dimensional position of the measurement point X (hereinafter, referred to as an approximate three-dimensional position) by offset observation from the position and the posture (marker axial direction 4r) of the emission port 4b of the measuring marker 4 and the laser distance L in a three-dimensional coordinate system with an origin set at the reference point. The processing device 3 transmits the approximate three-dimensional position of the measurement point X to the surveying instrument 2.

(4) The surveying instrument 2 sets a horizontal angle and a vertical angle to the approximate three-dimensional position of the measurement point X, orients the telescope 2a (distance-measuring section 28) at these set angles by the drive sections 23 and 24, images a region including the measurement point X (that is, the end point of the image of the laser light 4') by the imaging section 27, and transmits the acquired image to the processing device 3.

(5) The processing device 3 (image analyzing section 36) compares the image from the eyewear device 5 with the image from the surveying instrument 2 by using a known image matching technology, and identifies the end point position of the image of the laser light 4' in the three-dimensional coordinate system with an origin set at the reference point. The processing device 3 transmits the three-dimensional position of the measurement point X identified by image matching (hereinafter, referred to as an identified three-dimensional position) to the surveying instrument 2.

(6) The surveying instrument 2 sets a horizontal angle and a vertical angle to the identified three-dimensional position of the measurement point X, orients the telescope 2a (distance-measuring section 28) at these set angles by the drive sections 23 and 24, measures a distance to the identified three-dimensional position by a non-prism distance measuring by the distance-measuring section 28, and measures angles by the angle-measuring sections 21 and 22. The surveying instrument 2 provides an identification ID to this measurement point X, and transmits three-dimensional position data (latitude, longitude, and elevation) to the processing device 3.

(7) The processing device 3 displays measurement results of the measurement points X in order of measurement in list form on the display section 34 (refer to FIG. 9). The processing device 3 also records the measurement results in the storage device 33. However, the recording area is not limited to the processing device 3, and the measurement results may be recorded in a device or a server that manages the processing device 3 by being connected to the processing device 3 via the Internet, etc. It is also preferable that, in association with the three-dimensional position data, instruction data (the image imaged by the eyewear device 5, the image imaged by the surveying instrument 2, and position information of the emission port 4b of the measuring marker 4) are also recorded.

(8) When the measurement is completed for all measurement points X, the processing device 3 notifies the worker of the measurement completion. The notification means may be adopted from a known means, and for example, the measurement completion is displayed on the eyewear device 5, a notification sound is emitted from a speaker provided in the eyewear device 5 or the measuring marker 4, or a notification is given to a worker's mobile phone registered in the measuring system 1.

(Effect)

As described above, according to the present embodiment, the measuring system 1 measures designated measurement points by action independent of a worker by cooperative operation of the surveying instrument 2, the processing device 3, the measuring marker 4, and the eyewear device 5. Therefore, without waiting for a measurement by the surveying instrument, the worker can concentrate on designation of measurement points. After finishing designation, the worker can perform another work. In this way, according to the present embodiment, in particular when there are a plurality of measurement points X, a worker's work time is significantly shortened.

In the present embodiment, it is important that the measuring system 1 grasps a position of a measurement point X that the worker designated without error. With respect to this, the wire frame viewed through the eyewear device 5 and laser light 4' of the measuring marker 4 serve as guides for increasing accuracy of the worker's visual designation. In addition, use of the position sensor 46, the posture sensor 44, 45, and the distance meter 48 of the measuring marker 4 for calculation of approximate three-dimensional positions of measurement points X and matching between an image acquired by the surveying instrument 2 and an image acquired by the eyewear device 5 for calculation of an identified three-dimensional position of each measurement point X respectively contribute to improvement in position accuracy. In this way, according to the present embodiment, even when there are a plurality of designated measurement points X, the measurement points X can be accurately identified.

2. Modifications

The embodiments described above are preferably modified as follows.

2-1. Modification 1

In (6) of "1-7-2. Workflow to be performed by measuring system" described above, the surveying instrument 2 notified of the identified three-dimensional position of the measurement point X from the processing device 3 and automatically measures the identified three-dimensional position. However, it is assumed that some measurement points that fail to be automatically measured occurs due to reasons such as the presence of a temporary obstacle such as a passerby.

With respect to this, in Modification 1, for example, when a measurement failure occurs at a measurement point xm, as to the measurement point xm, the surveying instrument 2 transmits information on the measurement failure together with an identification ID to the processing device 3, and moves on to a measurement of the next measurement point xm+1.

The processing device 3 that has received information on the measurement failure displays a notification of the measurement failure at the measurement point xm as a message on the display 57 of the eyewear device 5.

Figure 10:
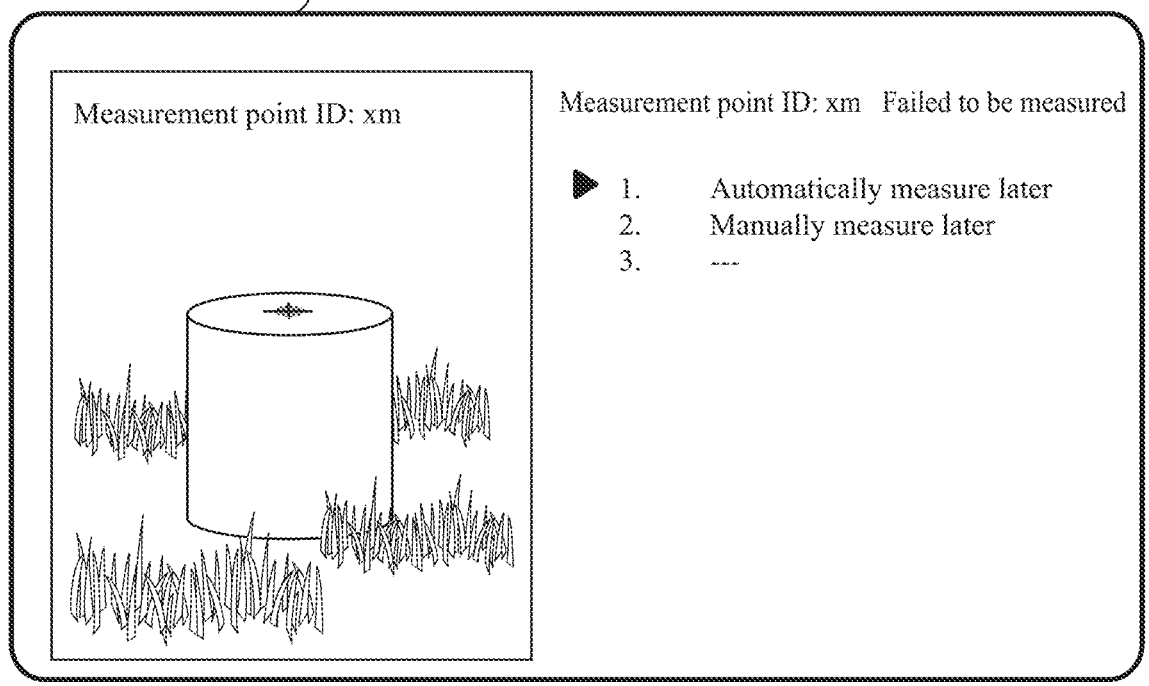
FIG. 10 is a display example of an eyewear device according to Modification 1.

At this time, it is also preferable that the information is displayed together with an image of the measurement point xm imaged by the eyewear device 5. Further, it is also preferable that choices are displayed to prompt on how to process the measurement point xm that has failed to be measured. For example, concerning the measurement point xm, choices of processing such as "Automatically measure later," and "Manually measure later" are displayed (refer to FIG. 10). The worker chooses desired processing by operating the eyewear device 5. After choosing, the choices disappear from the display 57, and the display restores to the original measurement screen. When "Automatically measure later" is chosen, the processing device 3 inserts the measurement point xm to the end of the measurement waiting queue. After measuring all designated measurement points, the surveying instrument 2 measures the measurement point xm again.

In this way, according to Modification 1, the measuring system 1 can prepare for a measurement failure, so that a worker can identify which measurement point a failure occurs at and instruct processing for the failure in the middle of the work. The notification and choice described above may be realized by voice when the eyewear device 5 includes a speaker.

2-2. Modification 2

In (5) of "1-7-2. Workflow to be performed by measuring system" described above, the processing device 3 calculates the identified three-dimensional position of the measurement point X by image matching. Here, as the time for image matching becomes longer, the accuracy of the measurement point (for example, assumed to be a measurement point xk) becomes lower. Therefore, according to a time required for image matching, a measurement accuracy index is provided. The measurement accuracy index may be, for example, ranks such as Excellent, Good, Acceptable, and Unacceptable or A, B, C, and D, or a calculated numerical value of the error. Instead of determining the measurement accuracy index only based on the time taken for image matching (time from the matching start to measurement completion), and the index may be adjusted in consideration of the fact that matching takes longer time as the distance to the measurement point becomes longer.

It is also preferable that the measurement accuracy index is reflected in the list form of the measurement results in (7) of "1-7-2. Workflow to be performed by measuring system" described above (refer to FIG. 11). With respect to the measurement points x1, x2, x3, xk . . . , the measuring system 1 displays indexes of measurement accuracy together with three-dimensional position data. Further, it is also preferable that display in divided colors, for example, Unacceptable=red, Acceptable=yellow, Excellent/Good=green is given to call the worker's attention.

In this way, according to Modification 2, the worker can identify respective measurement accuracies of the plurality of measurement points, and for a measurement point with poor accuracy, can take measures such as measuring manually or measuring again by changing the method for designating the measurement point. Further, it is also possible that Modification 2 is combined with Modification 1, the eyewear device 5 is notified of the measurement accuracies, and processing to be chosen in response to the measurement accuracy can be set in advance, for example, Unacceptable=Manually measure later, Acceptable=Automatically measure later, etc.

2-3. Modification 3

Figure 12A:
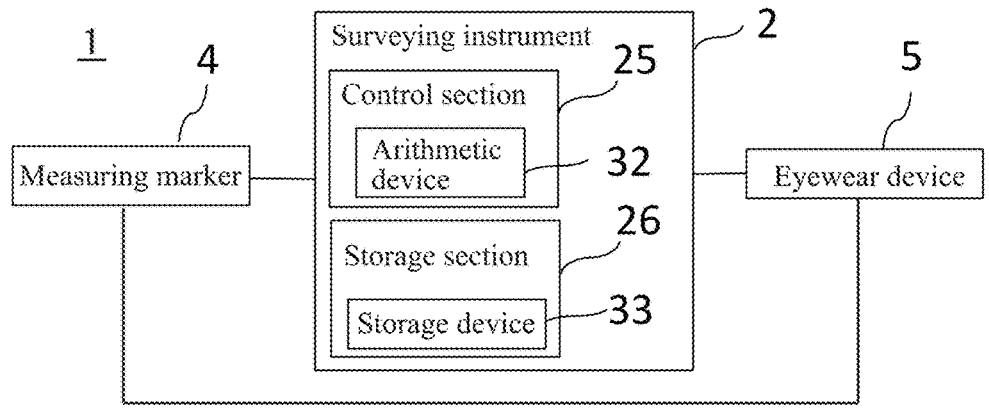
FIG. 12A is a configuration block diagram when an arithmetic device and a storage device are included in a surveying instrument according to Modification 3.
Figure 12B:
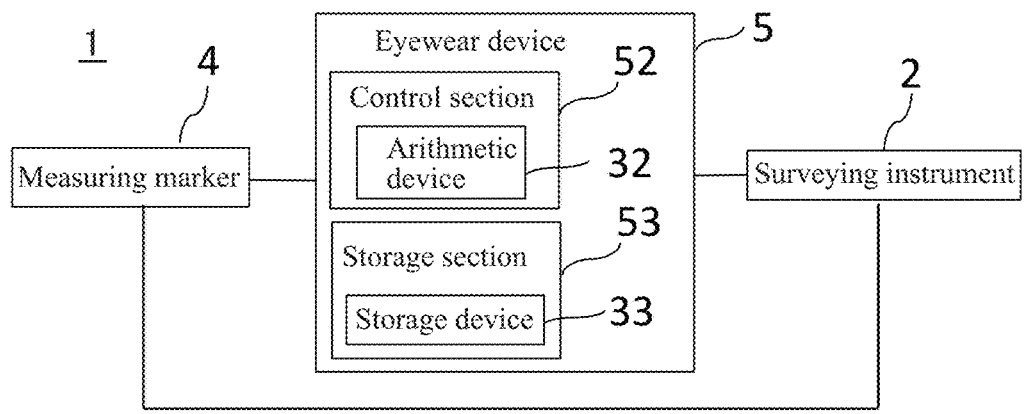
FIG. 12B is a configuration block diagram when the arithmetic device and the storage device are included in an eyewear device according to Modification 3.
Figure 12C:
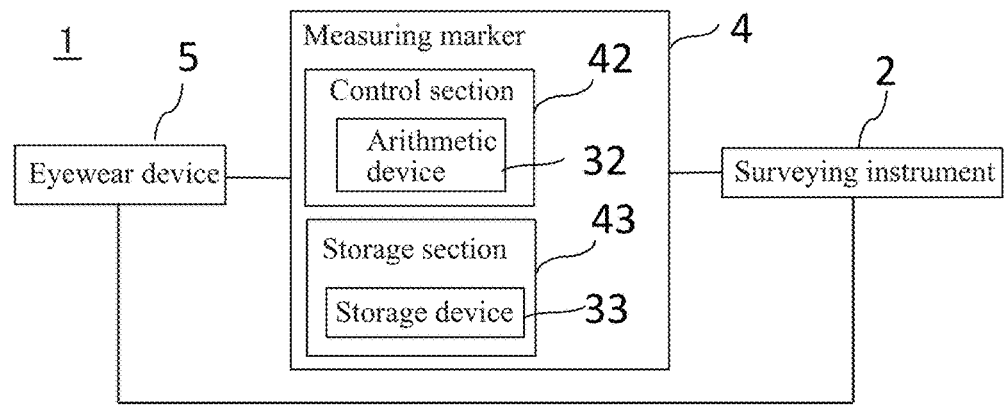
FIG. 12C is a configuration block diagram when the arithmetic device and the storage device are included in a measuring marker according to Modification 3.
Figure 13:
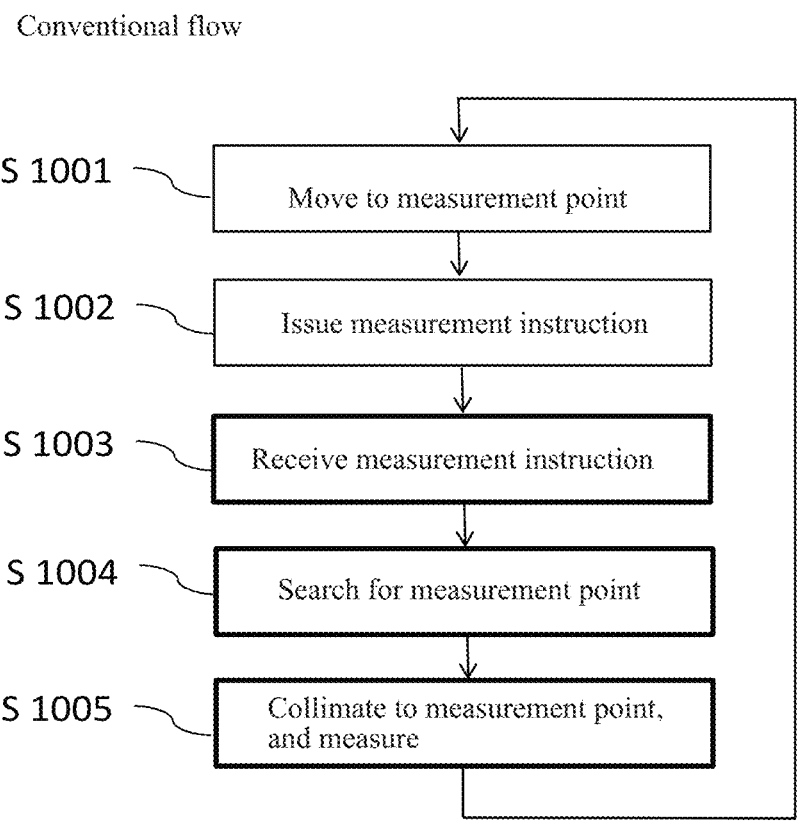
FIG. 13 illustrates a conventional workflow when there are a plurality of measurement points.

In the embodiments described above, the measuring system 1 includes four elements of the surveying instrument 2, the processing device 3, the measuring marker 4, and the eyewear device 5, and the processing device 3 includes the arithmetic device 32 (the synchronizing section 35 and the image analyzing section 36) and the storage device 33 (CAD design data 37). However, the arithmetic device 32 (the synchronizing section 35 and the image analyzing section 36) and the storage device 33 (CAD design data 37) may be included in the surveying instrument 2, the eyewear device 5, or the measuring marker 4. FIG. 12A illustrates a configuration in which the control section 25 of the surveying instrument 2 includes the arithmetic device 32, and the storage section 26 includes the storage device 33. FIG. 12B illustrates a configuration in which the control section 52 of the eyewear device 5 includes the arithmetic device 32, and the storage section 53 includes the storage device 33. FIG. 12C illustrates a configuration in which the control section 42 of the measuring marker 4 includes the arithmetic device 32, and the storage section 43 includes the storage device 33. Alternatively, although not illustrated, all of the surveying instrument 2, the eyewear device 5, and the measuring marker 4 can communicate with each other, so that combinations in which the eyewear device 5 includes the arithmetic device 32, and the surveying instrument 2 includes the storage device 33, are also possible. In this way, the measuring system 1 may consist of three elements of the surveying instrument 2, the measuring marker 4, and the eyewear device 5. In this case, measurement results output to the display section 34 of the processing device 3 may be displayed in list form on the surveying instrument 2 or the eyewear device 5.

In the embodiments described above, when a worker designates a measurement point X by a prism, the distance-measuring section 28 of the surveying instrument 2 may perform a prism distance measuring.

Embodiments and modifications of the measuring system 1 have been described above, however, besides these, the respective embodiments and modifications can be combined based on the knowledge of a person skilled in the art, and such a combined embodiment is also included in the scope of the present invention.

REFERENCE SIGNS LIST

1 Three-dimensional position measuring system
2 Surveying instrument
2' Distance-measuring light
21 Horizontal angle detector (angle-measuring section)
22 Vertical angle detector (angle-measuring section)
23 Horizontal rotation drive section (drive section)
24 Vertical rotation drive section (drive section)
27 Imaging section
28 Distance-measuring section
29 Communication section
3 Processing device
31 Communication section
32 Arithmetic device
33 Storage device
34 Display section
4 Measuring marker
4r Axial direction
4b Emission port
4' Laser light
48' Laser distance-measuring light
41 Communication section
44 Accelerometer (posture sensor)
45 Gyro sensor (posture sensor)
46 GPS device (position sensor)
47 Laser emitting section
48 Distance meter
5 Eyewear device
51 Communication section
54 Accelerometer (posture sensor)
55 Gyro sensor (posture sensor)
56 GPS device (position sensor)

57 Display
58 Imaging section

The invention claimed is:

1. A three-dimensional position measuring system comprising:
a surveying instrument including a distance-measuring section capable of performing a non-prism distance measuring of a measurement point by distance-measuring light, an imaging section configured to perform imaging in an optical axis direction of the distance-measuring light, an angle-measuring section configured to measure a vertical angle and a horizontal angle at which the distance-measuring section is oriented, a drive section configured to drive the vertical angle and the horizontal angle of the distance-measuring section to set angles, and a communication section;
a measuring marker to be carried by a worker, including a position sensor, a posture sensor, a laser emitting section configured to emit laser light of visible light in an axial direction, an emission port for the laser light, a distance meter configured to measure a laser distance from the emission port to the measurement point, and a communication section;
an eyewear device to be worn on the head of the worker, including a display configured to cover the eyes of the worker, an imaging section configured to perform imaging in a line-of-sight direction of the worker, a position sensor, a posture sensor, and a communication section, and
an arithmetic device configured to communicate with the surveying instrument, the measuring marker, and the eyewear device, synchronize coordinate spaces of the surveying instrument, the measuring marker, and the eyewear device, and calculate an identified three-dimensional position of the measurement point by image analysis from images including the measurement point imaged by the imaging section of the surveying instrument and the imaging section of the eyewear device, wherein
the identified three-dimensional positions of a plurality of the measurement points are measured by the surveying instrument in the order in which measurement instructions were issued by the worker.

2. The three-dimensional position measuring system according to claim 1, wherein
when the worker irradiates a certain measurement point among the plurality of measurement points with the laser light of the measuring marker while visually recognizing the measurement point with the eyewear device, and issues the measurement instruction,
the measuring marker calculates a position and a posture of the emission port from the position sensor and the posture sensor of the measuring marker, and measures the laser distance by the distance meter, the eyewear device images an image including an image of the laser light by the imaging section of the eyewear device, the surveying instrument images an image including an image of the laser light by the imaging section of the surveying instrument based on an approximate three-dimensional position of the measurement point calculated by offset observation from the position and the posture of the emission port of the measuring marker and the laser distance, and the arithmetic device performs, as the image analysis, image matching between images including the image of the laser light imaged by the imaging section of the surveying instrument and the imaging section of the eyewear device, specifies an end point position of the image of the laser light as a position of the measurement point and calculates the identified three-dimensional position.

3. The three-dimensional position measuring system according to claim 1, wherein
the three-dimensional position measuring system further comprises a storage device configured to store CAD design data of a survey site of the worker, and the arithmetic device synchronizes coordinate spaces of the surveying instrument, the measuring marker, the eyewear device, and the CAD design data, and displays a wire frame of the CAD design data viewed from the position and the posture of the eyewear device on the display of the eyewear device so that the wire frame is superimposed on an actual landscape of the survey site.

4. The three-dimensional position measuring system according to claim 1, wherein
the three-dimensional position measuring system further comprises a display section capable of being checked at the survey site by the worker, and on the display section, three-dimensional position data of the plurality of measurement points measured by the surveying instrument are displayed in list form together with identification IDs in order of measurement.

5. The three-dimensional position measuring system according to claim 4, wherein
the three-dimensional position measuring system lowers a measurement accuracy index of the measurement as a time to be taken for the image analysis becomes longer, and also displays the measurement accuracy index in the list form.

6. The three-dimensional position measuring system according to claim 1, wherein
when a measurement point where the surveying instrument has failed to measure occurs, the three-dimensional position measuring system notifies the worker of the failure through the eyewear device, and prompts the worker on how to process the measurement point and causes the worker to make a choice through the eyewear device.

7. A three-dimensional position measuring method comprising a surveying instrument, a measuring marker, an eyewear device, and an arithmetic device, and
for a plurality of measurement points, in the order in which measurement instructions were issued by a worker, repeating the following (a) to (e):
(a) a step of transmitting position information and posture information of an emission port for laser light of the measuring marker with which the measurement point has been irradiated, and a laser distance from the emission port to the measurement point, to the arithmetic device;
(b) a step of acquiring an image including an image of the laser light at the time of the step (a) by an imaging section of the eyewear device;
(c) a step of calculating an approximate three-dimensional position of the measurement point by offset observation from the position and the posture of the emission port of the measuring marker and the laser distance, and imaging the approximate three-dimensional position by an imaging section of the surveying instrument to acquire an image including an image of the laser light;
(d) a step of performing image matching between the image acquired by the eyewear device in the step (b) and the image acquired by the surveying instrument in the step (c), and specifying an end point position of the image of the laser light as an identified three-dimensional position of the measurement point of the step (a); and (e) a step of measuring the identified three-dimensional position by the surveying instrument.

8. A storage medium storing a computer program of the three-dimensional position measuring method according to claim 7.

* * * * *